US012802829B2

(12) United States Patent
Schneck

(10) Patent No.: US 12,802,829 B2
(45) Date of Patent: Nov. 17, 2026

(54) OVERLAPPING TWISTED FUEL RODS

(71) Applicant: Gabriel Steven Schneck, East Lyme, CT (US)

(72) Inventor: Gabriel Steven Schneck, East Lyme, CT (US)

( * ) Notice: Subject to any disclaimer, the term of this patent is extended or adjusted under 35 U.S.C. 154(b) by 260 days.

(21) Appl. No.: 18/398,548

(22) Filed: Dec. 28, 2023

(65) Prior Publication Data

US 2024/0203612 A1 Jun. 20, 2024

Related U.S. Application Data

(60) Provisional application No. 63/478,110, filed on Dec. 30, 2022.

(51) Int. Cl.

*G21C 3/04* (2006.01)
*G21C 3/326* (2006.01)
*G21C 3/328* (2006.01)
*G21C 3/32* (2006.01)

(52) U.S. Cl.

CPC ............... *G21C 3/04* (2013.01); *G21C 3/326* (2013.01); *G21C 3/328* (2013.01); *G21C 3/32* (2013.01)

(58) Field of Classification Search

CPC ... G21C 3/04; G21C 3/08; G21C 3/32; G21C 3/328; G21C 3/336; G21C 3/338
See application file for complete search history.

(56) References Cited

U.S. PATENT DOCUMENTS

| | | | | |
|---|---|---|---|---|
| 3,361,640 A * | 1/1968 | Hassig | G21C 3/32 | 376/454 |
| 4,324,618 A * | 4/1982 | Schluderberg | G21C 3/338 | 376/454 |
| 2011/0255651 A1* | 10/2011 | Bashkirtsev | G21C 3/58 | 376/412 |
| 2023/0282380 A1* | 9/2023 | Fisher | B64G 1/408 | 72/255 |

* cited by examiner

*Primary Examiner* — Sharon M Davis

(57) ABSTRACT

Provided are twisted fuel rod bundles arranged in a pattern that allows for the twisted fuel rod circumferential cross sections to overlap which increases power density, minimizes volume, increase heat transfer characteristics and provides for more structural support.

6 Claims, 6 Drawing Sheets

– – PRIOR ART – –

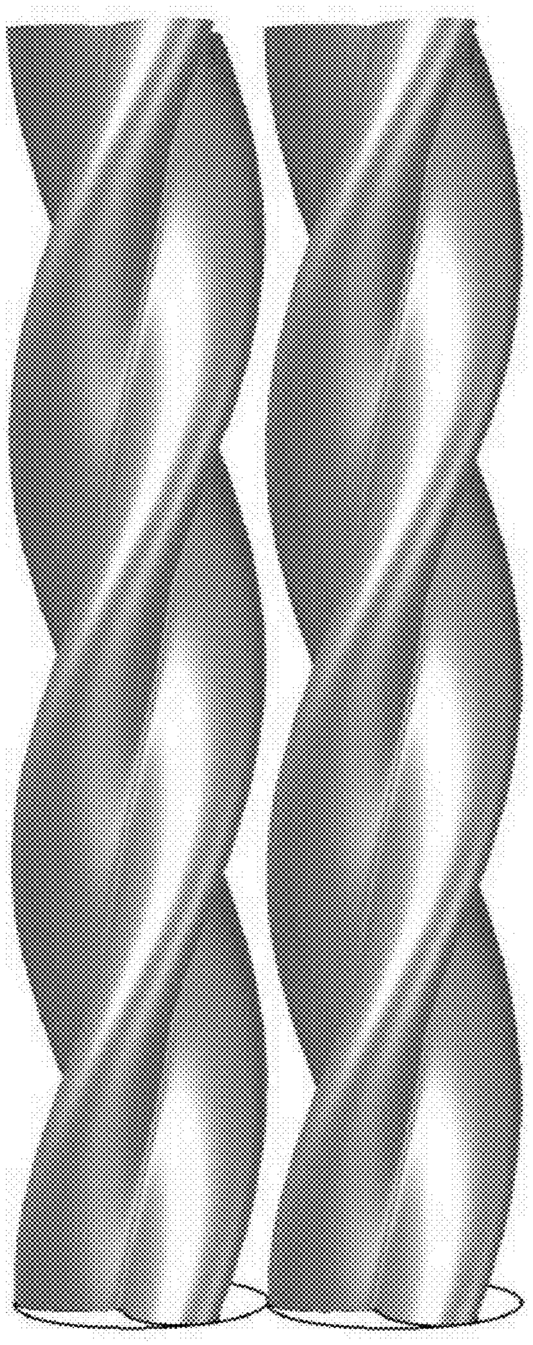
Figure 3a1
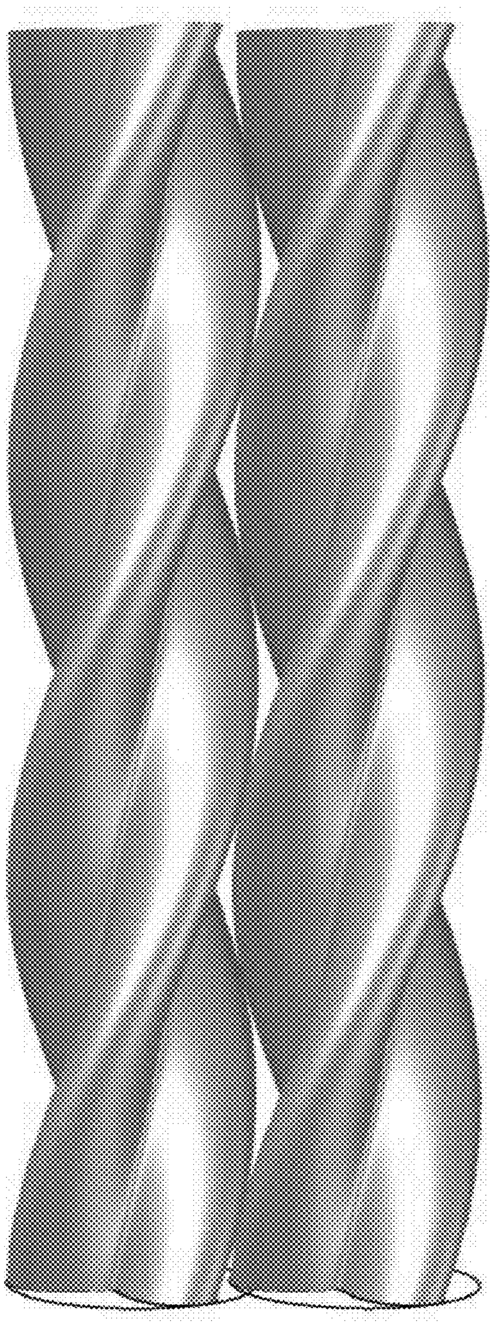
Figure 3a2
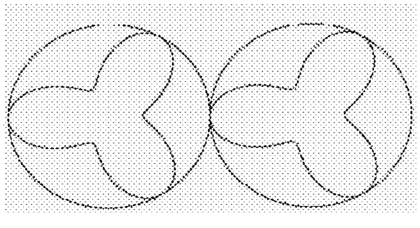
Figure 3a3
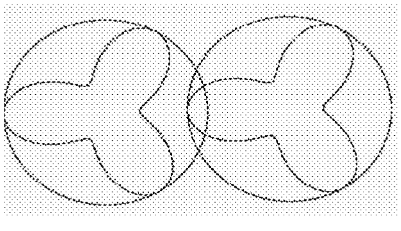
Figure 3a4

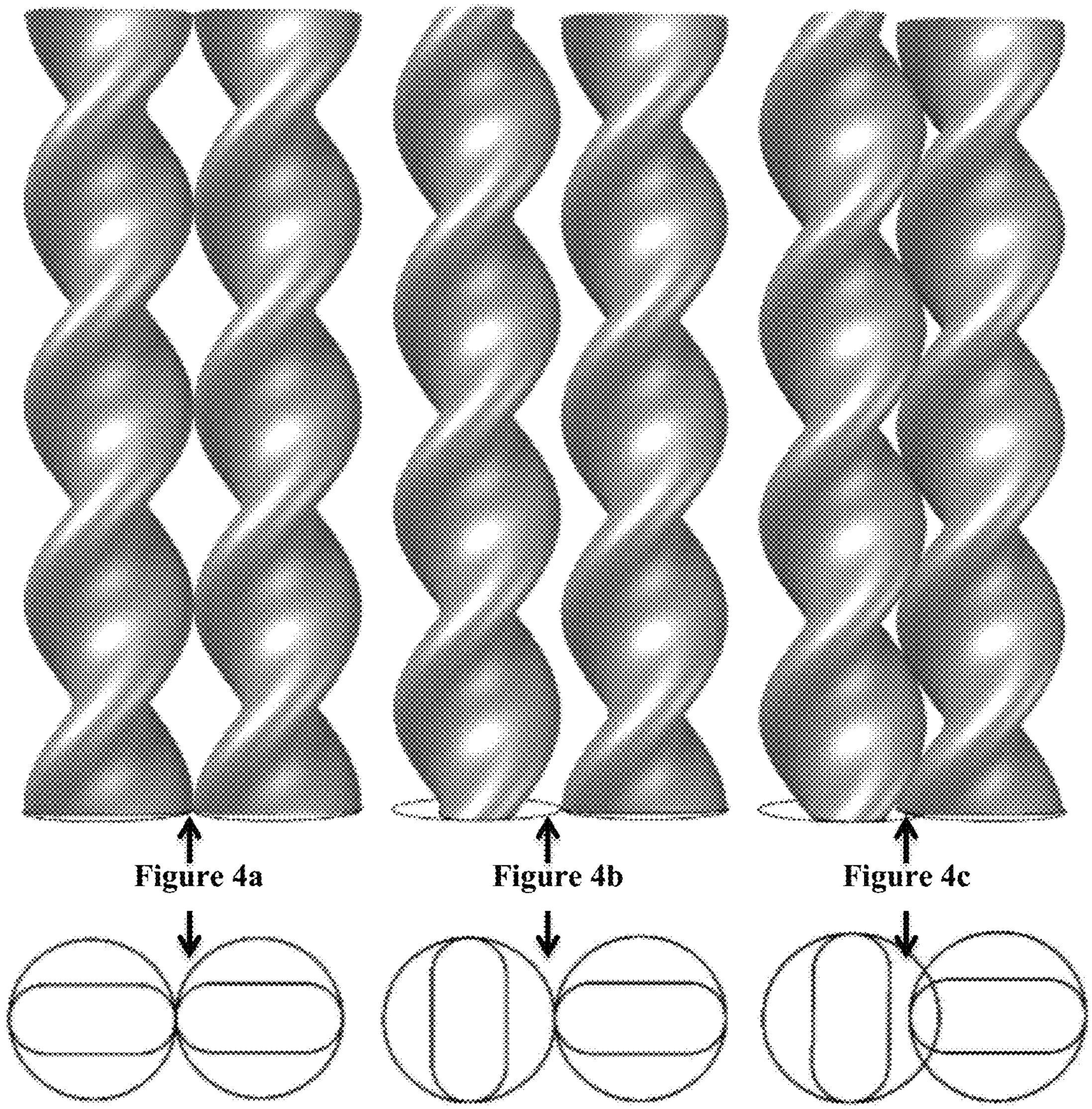
Figure 4a
Figure 4b
Figure 4c
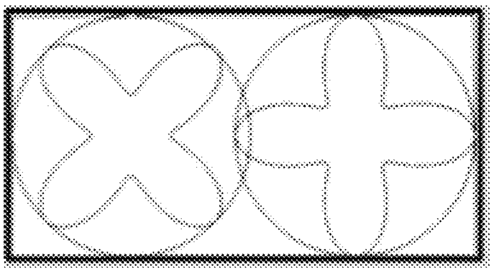
Figure 5

OVERLAPPING TWISTED FUEL RODS

CROSS-REFERENCE TO RELATED APPLICATIONS

This application claims the benefit of U.S. Provisional Patent Application No 63/478,110 filed Dec. 30, 2022, which is incorporated by reference herein in its entirety.

FIELD OF INVENTION

Embodiments of the present invention relate generally to fuel bundles for nuclear fission energy and more particularly to embodiments providing a plurality of bundled of twisted fission rods whose circumferential cross sections overlap.

BACKGROUND OF THE INVENTION

Lightbridge Corporation is developing twisted fuel rod technology. The rods that Lightbridge uses are twisted rods that are either a tri-lobed or quad-lobed shaped. As defined in US 2016/0035411A published Feb. 4, 2016, Lightbridge aligns their fuel rods so that the circumferential cross sections do not overlap as indicated in FIG. 1. This invention describe in this non-provisional patent application is an improvement over this design because it aligns the rods in a more compact arrangement by allowing the circumferential cross sections to overlap to achieve a more desirable spacing, which can increase the power density of the fuel bundle. Allowing the circumferential cross sections of the individual fuel rods to overlap can also allow for better heat transfer characteristics, and can minimize shell side volume while also allowing for more structural support. This circumferential cross section overlap is an improvement over the current design.

BRIEF SUMMARY OF INVENTION

In one embodiment of the present invention, a novel nuclear fuel rod bundle arrangement is provided that places the fuel rods adjacent to each other such that their circumferential cross sections overlap.

FIG. **3*a*1** shows tri lobed fuel rods that do not overlapped.

FIG. **3*a*2** shows the circumferential cross sections of tri lobed fuel rods that do not overlapped.

FIG. **3*a*3** shows tri lobed fuel rods whose circumferential cross sections are no overlapped.

FIG. **3*a*4** shows the cross sections of tri lobed fuel rods whose circumferential cross sections are overlapped.

FIG. **4*a*** shows bi-lobed fuel rods whose circumferential cross sections do not overlap.

FIG. **4*b*** shows that when one rod is twisted with respect to an adjacent rod, a gap is formed.

FIG. **4*c* shows the rods in FIG. 4*b*** can be pushed together such that their circumferential cross sections overlap.

FIG. 5 shows the circumferential cross section of quad-lobed rods whose circumferential cross sections overlap.

Figure 6:
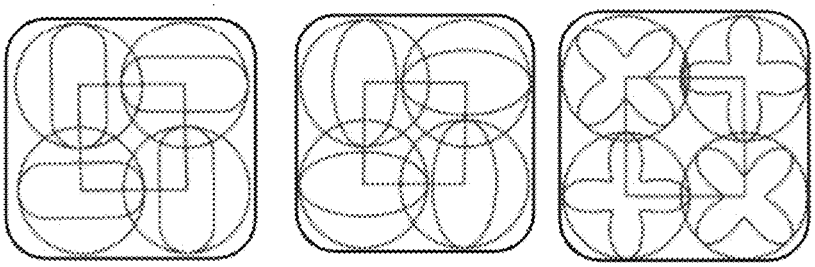

FIG. 6 shows the circumferential cross section of quad-lobed and bi-lobed rods whose circumferential cross sections overlap and form a square pitch pattern.

Figure 7:
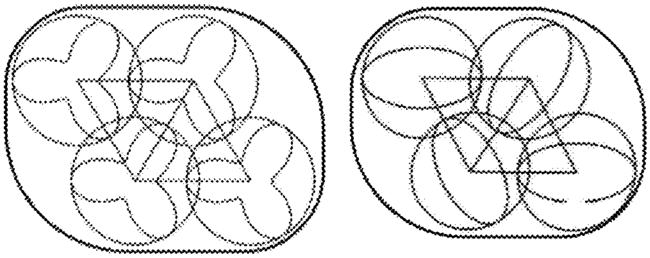

FIG. 7 shows a cross section of tri-lobed and bi-lobed tubes whose circumferential cross sections overlap while arranged in a triangular pitched pattern.

NOTE: Quad-lobed tubes can also be arranged in a triangular pitch whose circumferential cross sections can overlap.

Figure 8:
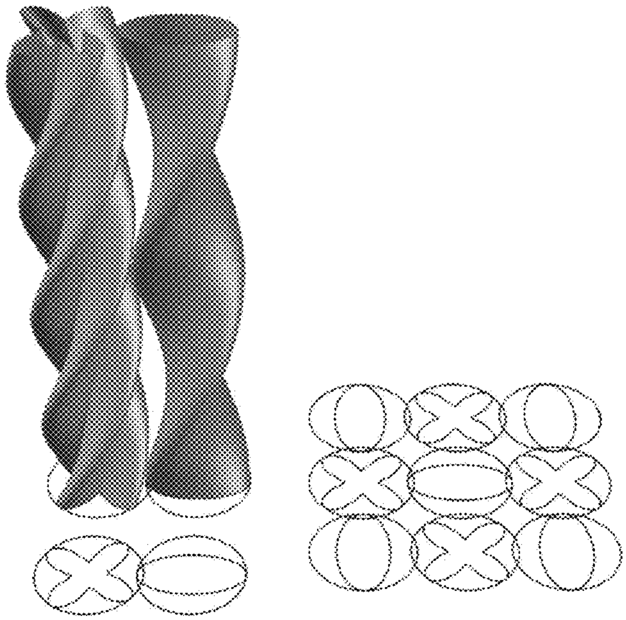

FIG. 8 shows various n-lobed rods that can be arranged in a square pitch such that their circumferential cross sections overlap.

Figure 9:
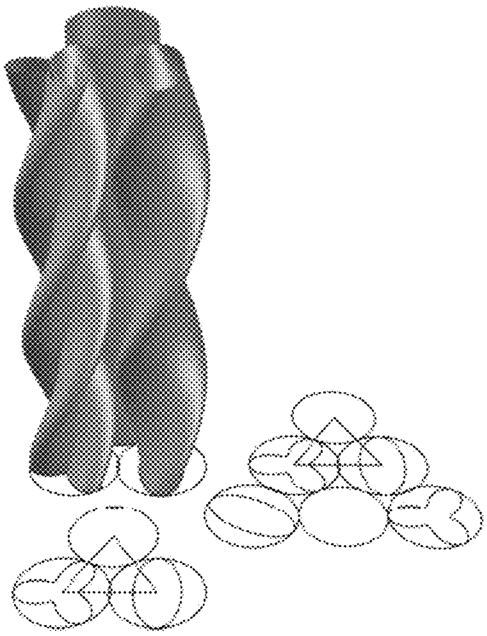

FIG. 9 shows various n-lobed rods that can be arranged in a triangular pitch such that their circumferential cross sections overlap.

DETAILED DESCRIPTION OF THE INVENTION

Figure 2:
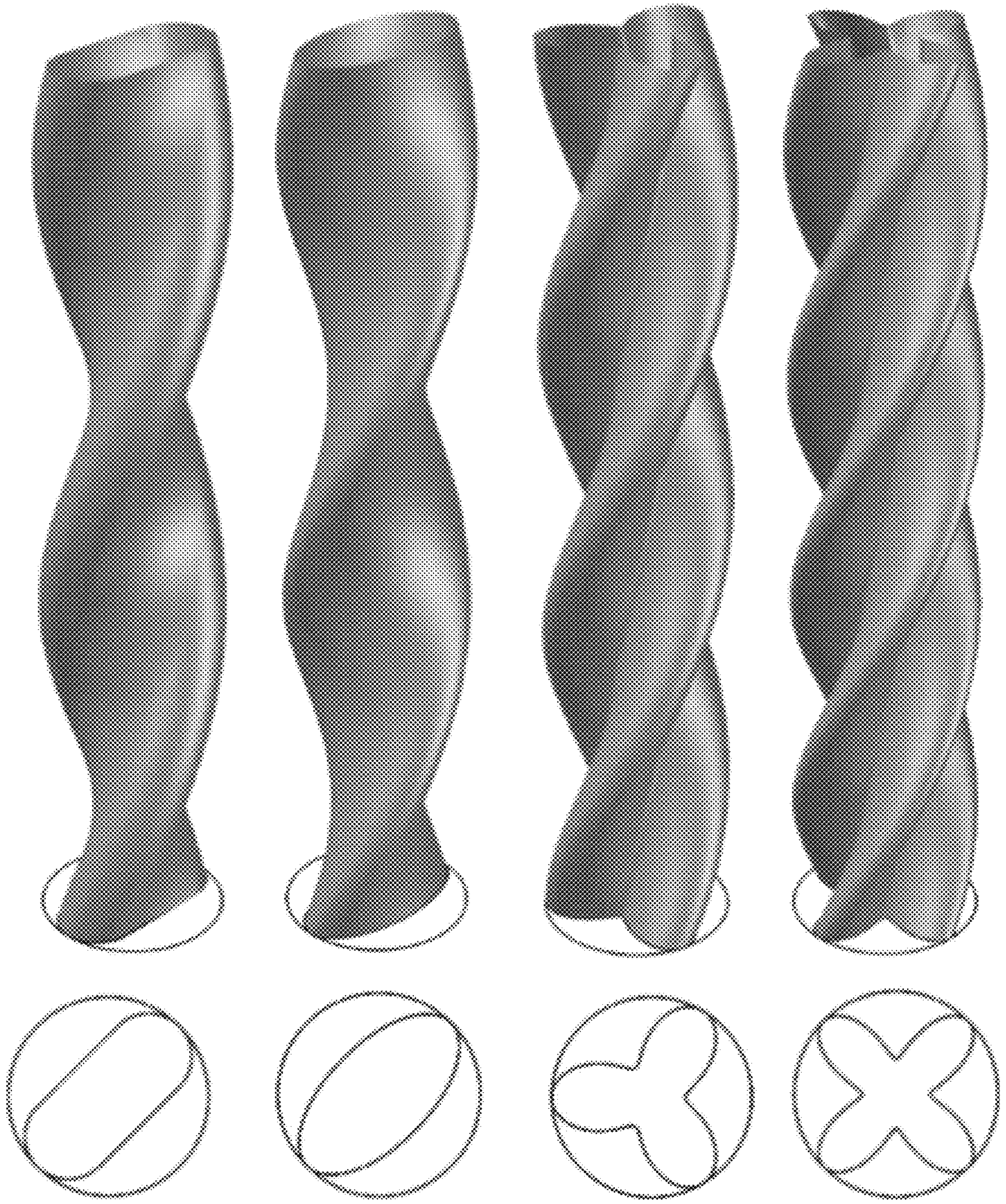
FIG. 2 shows various n-lobed fuel rod shapes that can potentially be used and their corresponding cross sections.

The following discussion describes how the circumferential cross sections for adjacent fuel elements in a bundle can overlap to make the fuel bundle more compact as it relates to bi-lobed (2 lobes), tri-lobed (3 lobes), and quad-lobed (4 lobes) fuel rods as seen in FIG. 2. Even though this discussion is limited to 2-4 lobed tubes, the improvement can work for any number of lobes. For the purposes of this discussion, the circumferencial cross section for a single rod is defined by the circle that can be circumscribed around tube as well as the shape of the tube itself inside the circle as can be seen in the circumferencial cross section views in FIG. 2.

Figure 1:
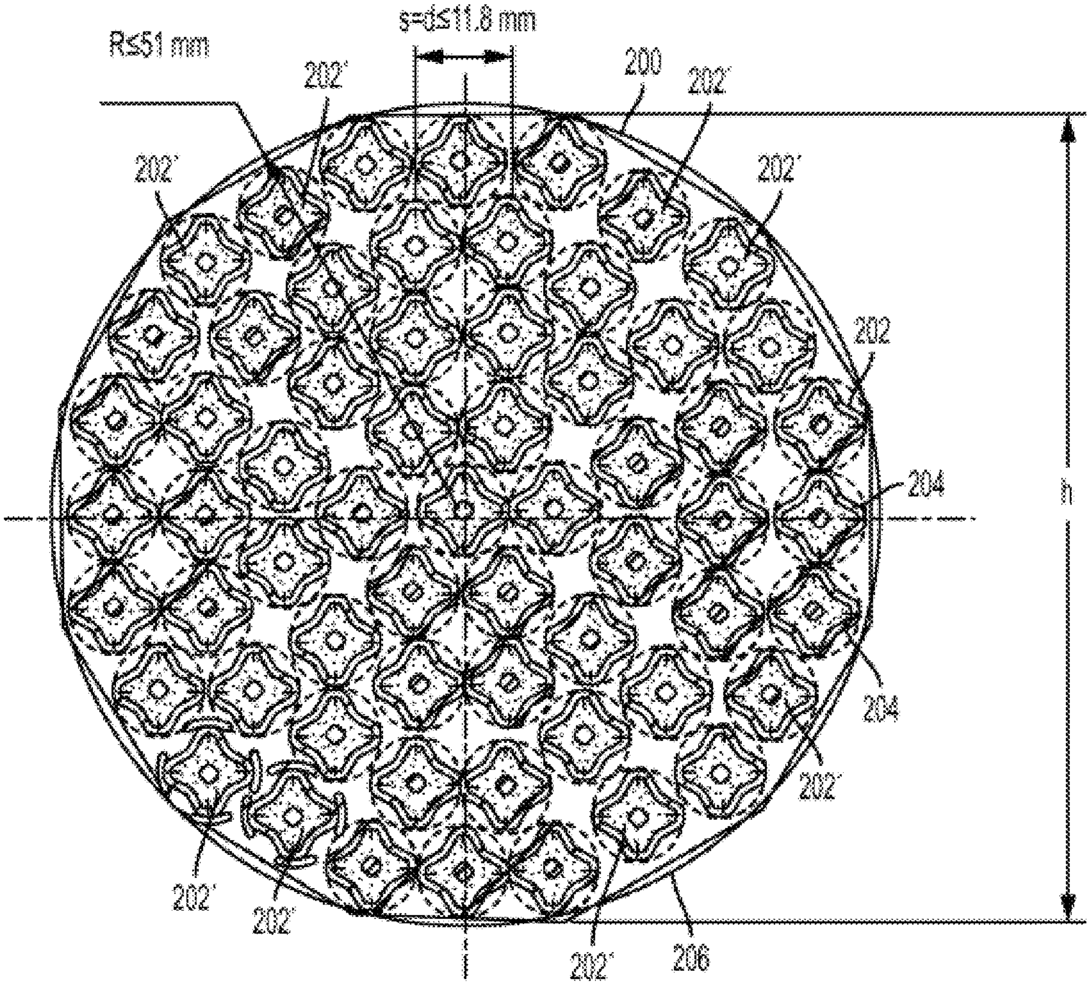
FIG. 1 shows a drawing from Lightbridge patent describing a cross section of fuel elements.

FIGS. **3*a*1, 3*a*2, 3*a*3, 3*a*4 demonstrate that, when appropriately arranged, trilobed rods can be pushed closer together. A gap between rods can be seen when looking at the arrangement between the rods in FIG. 3*a*1 and FIG. 3*a*2. In order for them to touch, the rods need to be pushed together as seen in FIG. 3*a*3 and FIG. 3*a*4** resulting in their circumferencial cross sections overlapping.

FIGS. **4*a*, 4*b* and 4*c* extend the above argument to bi-lobed rods. FIG. 4*a* shows bi-lobed fuel rods whose circumferential cross sections do not overlap. However, when one rod is rotated with respect to an adjacent rod as shown in FIG. 4*b*, a gap is formed. To close this gap, the rods must be pushed together as shown in FIG. 4*c***. When this occurs, their circumferential cross sections overlap.

FIG. 5 extends the above arguments to quad lobed rods. FIG. 5 shows the circumferential cross section of quad lobed tubes that overlap.

FIG. 6 extends the circumferential cross section overlapping argument and shows that bi-lobed and quad-lobed rods can be arranged in square pitch pattern while their circumferential cross sections overlap.

FIG. 7 demonstrates that bi-lobed and tri-lobed rods can be arranged in a triangular pitch pattern while their circumferential cross sections overlap. Not show is the possibility of quad-lobed fuel rods, which can also be arranged, in a triangular pitched pattern while their circumferential cross sections overlap FIG. 8 demonstrates various n-lobed rods that can be arranged in a square pitch such that their circumferential cross sections overlap.

FIG. 9 shows various n-lobed rods that can be arranged in a triangular pitch such that their circumferential cross sections overlap.

In all of the above embodiments, the circumferential cross sections between adjacent fuel rods overlap which allows them to be closer together which increases power density, minimizes volume, increase heat transfer characteristics and provides for more structural support than fuel bundles described in the prior art.

The invention claimed is:

1. A fuel assembly for use in a core of a nuclear power reactor, the fuel assembly comprising:

a frame shaped and configured to fit within the core; and a plurality of helically twisted fuel elements each having a multi-lobed cross-sectional shape and comprising fissile and/or fertile material supported by the frame in a substantially circular bundle, wherein:

the plurality of helically twisted fuel elements comprises a plurality of bi-lobed helically twisted fuel elements and a plurality of quad-lobed helically twisted fuel elements, and individual circumferential cross sections of each of the helically twisted fuel elements circumferentially overlap.

2. The fuel assembly of claim 1, wherein the plurality of helically twisted fuel elements further comprises tri-lobed helically twisted fuel elements.

3. The fuel assembly of claim 1, wherein the helically twisted fuel elements are arranged in a square pitch pattern.

4. The fuel assembly of claim 1, wherein the helically twisted fuel elements are arranged in a triangular pitch pattern.

5. The fuel assembly of claim 1, wherein the fissile and/or fertile material comprises uranium, plutonium, or thorium.

6. A nuclear reactor system comprising: a reactor core; and the fuel assembly according to claim 1 disposed within the reactor core.

* * * * *